UNITED STATES PATENT OFFICE.

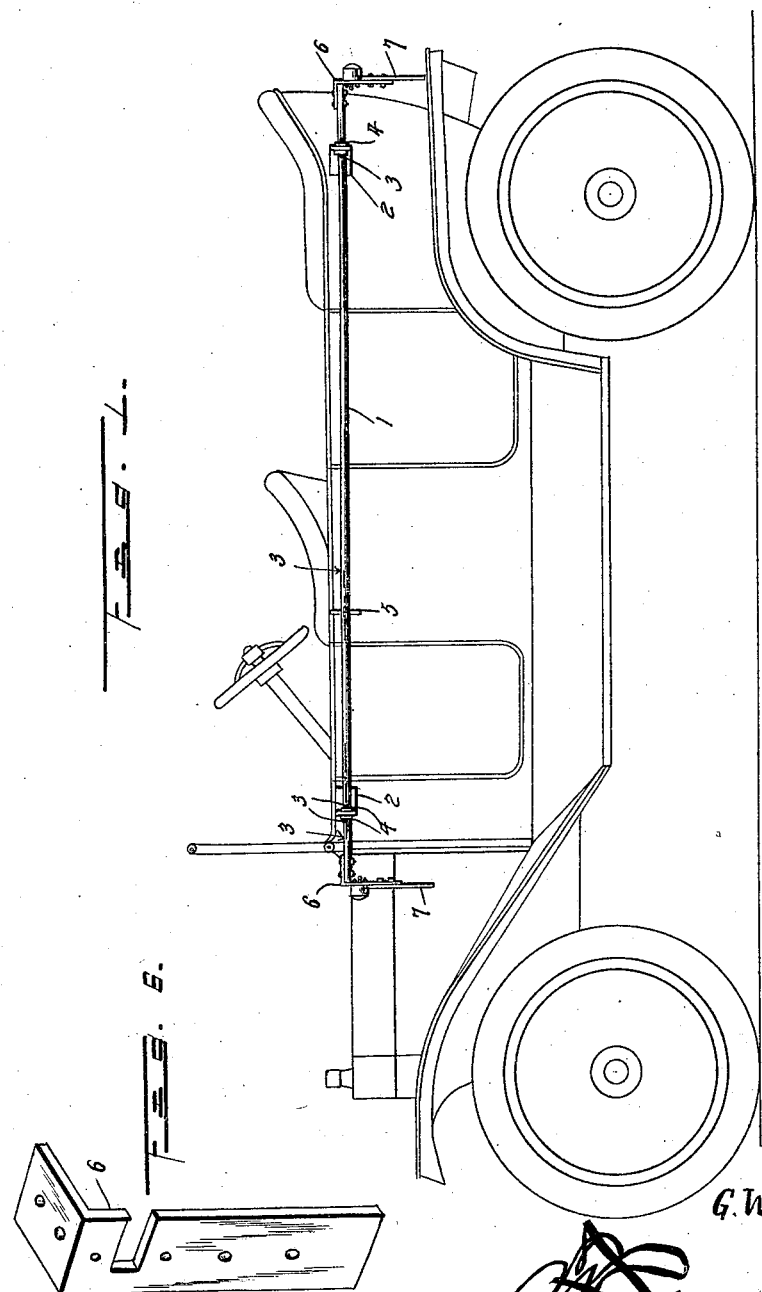

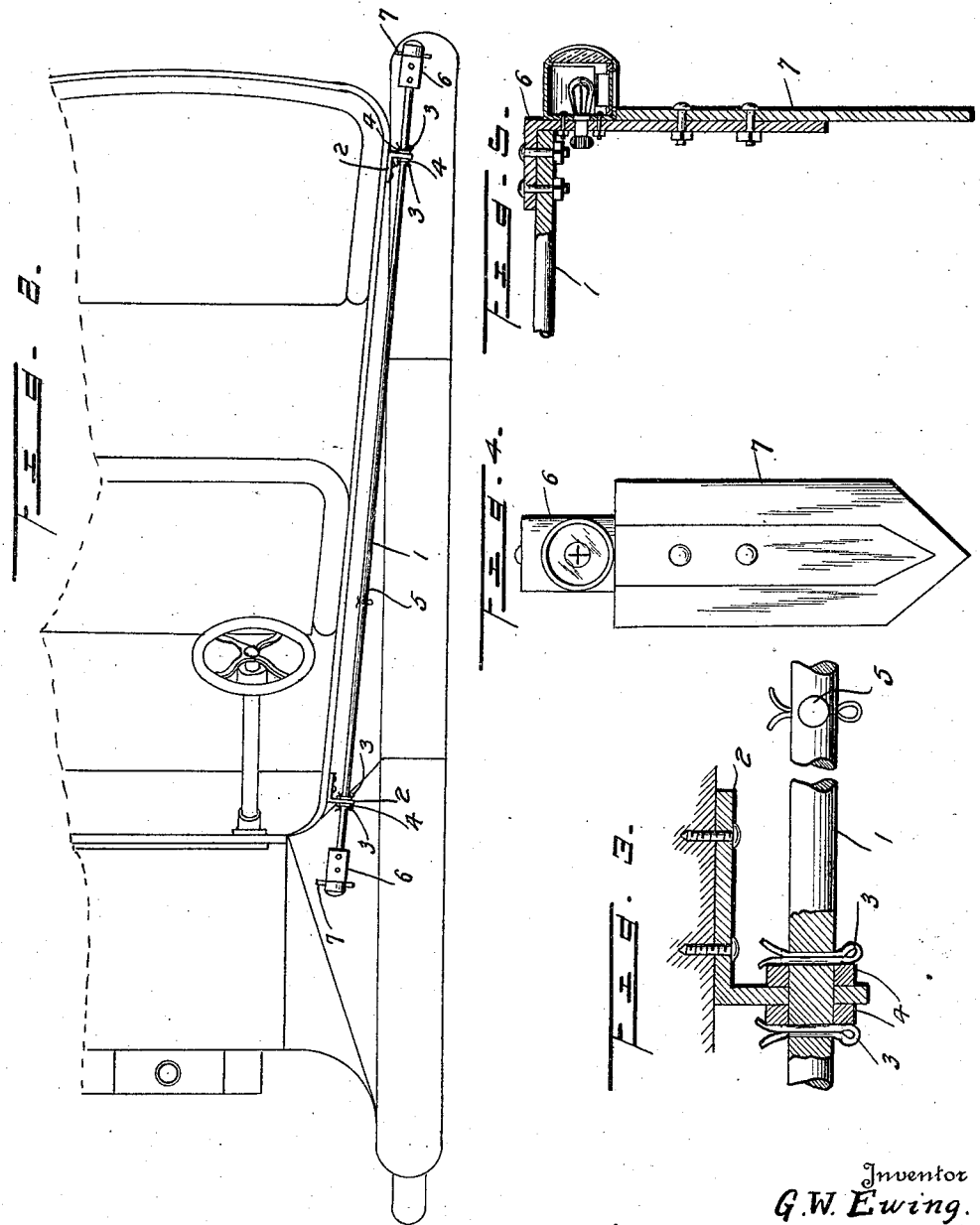

GEORGE W. EWING, OF CINCINNATI, OHIO.

TRAFFIC SIGNAL.

1,418,141. Specification of Letters Patent. Patented May 30, 1922.

Application filed May 9, 1921. Serial No. 468,076.

*To all whom it may concern:*

Be it known that I, GEORGE W. EWING, a citizen of the United States, residing at Cincinnati, in the county of Hamilton and State of Ohio, have invented certain new and useful Improvements in Traffic Signals; and I do hereby declare the following to be a full, clear, and exact description of the invention, such as will enable others skilled in the art to which it appertains to make and use the same.

In the operation of motor vehicles the tendency is towards safety for the pedestrian and the drivers of other vehicles, this being effected in part by signaling the intent of a driver when about to turn or stop so that the operator of a vehicle in the rear may be duly advised and govern his action according to the signal displayed by the vehicle in advance.

Other objects and advantages will be apparent and suggest themselves as the nature of the invention is understood.

While the drawings illustrate an embodiment of the invention, it is to be understood that in adapting the same to meet different conditions and requirements, various changes in the form, proportion and minor details of construction may be resorted to without departing from the nature of the invention.

Referring to the accompanying drawings forming a part of the specification,

Figure 1 is a side view of the body portion of an automobile provided with signaling means embodying the invention, Figure 2 is a top plan view of the parts illustrated in Figure 1, Figure 3 is a section on the line x—x of Figure 1, Figure 4 is an end view, Figure 5 is a detail view showing the means for connecting the signaling member to the operating rod, Figure 6 is a detail perspective view of one of the signal-mounting brackets.

Corresponding and like parts are referred to in the following description and designated in the several views of the drawings by like reference characters.

The signaling means comprises a rod 1 which is preferably disposed at one side of the vehicle and mounted in bearings 2 for free rotation. The bearings 2 preferably consist of brackets which are attached to any convenient part of the vehicle body. Longitudinal movement of the rod 1 is prevented by means of stops 3 which usually consist of cotter pins inserted through openings formed in the rod 1. Washers 4 are interposed between the stops 3 and that part of one of the bearings 2 in which the rod 1 is mounted. An operating lever 5, secured to the rod 1, is conveniently disposed for operation of the signal when required. The lever 5 also serves as indicating means to determine the required adjusted position of the signal members. The rod 1 is of such extent to admit of its ends clearing the front and the back of the vehicle body, whereby the latter is prevented from interfering with the free movement of the signal members. Brackets 6 are secured to opposite ends of the rod 1 and portions of such brackets have a lateral disposition so as to lie in planes transversely to the length of the vehicle. A signal member 7 is attached to each of the brackets 6 and preferably consists of an elongated plate pointed at its outer or free end and having portions of its sides of contrasting color, such as red and white, the broader portion of the member being red and the middle portion white. These signal members extend in the same direction and may point inwardly, outwardly, upwardly or downwardly according to the signal to be displayed. The relative position of the signal members is determined by the lever 5, as will be readily understood. The signal members 7 are disposed with reference to the head and tail lights so as to be illuminated thereby after dark whereby the signal may be effective at night as well as during the day.

What is claimed is:

A vehicle signal comprising an elongated rod, brackets to mount said rod for free rotation at one side of a vehicle with its ends projecting beyond the front and the rear of the vehicle body, signal members disposed to operate respectively in the front and rear of the vehicle, brackets to which said signal members are attached, said signal members and last mentioned brackets due to their weight adapted to normally hang vertically and angularly disposed portions on the second mentioned brackets attachable to said rod.

In testimony whereof I affix my signature in presence of two witnesses.

GEORGE W. EWING.

Witnesses:
FRANK KIEFEL, Jr.,
HERMAN G. POLKING.